Figure 1:
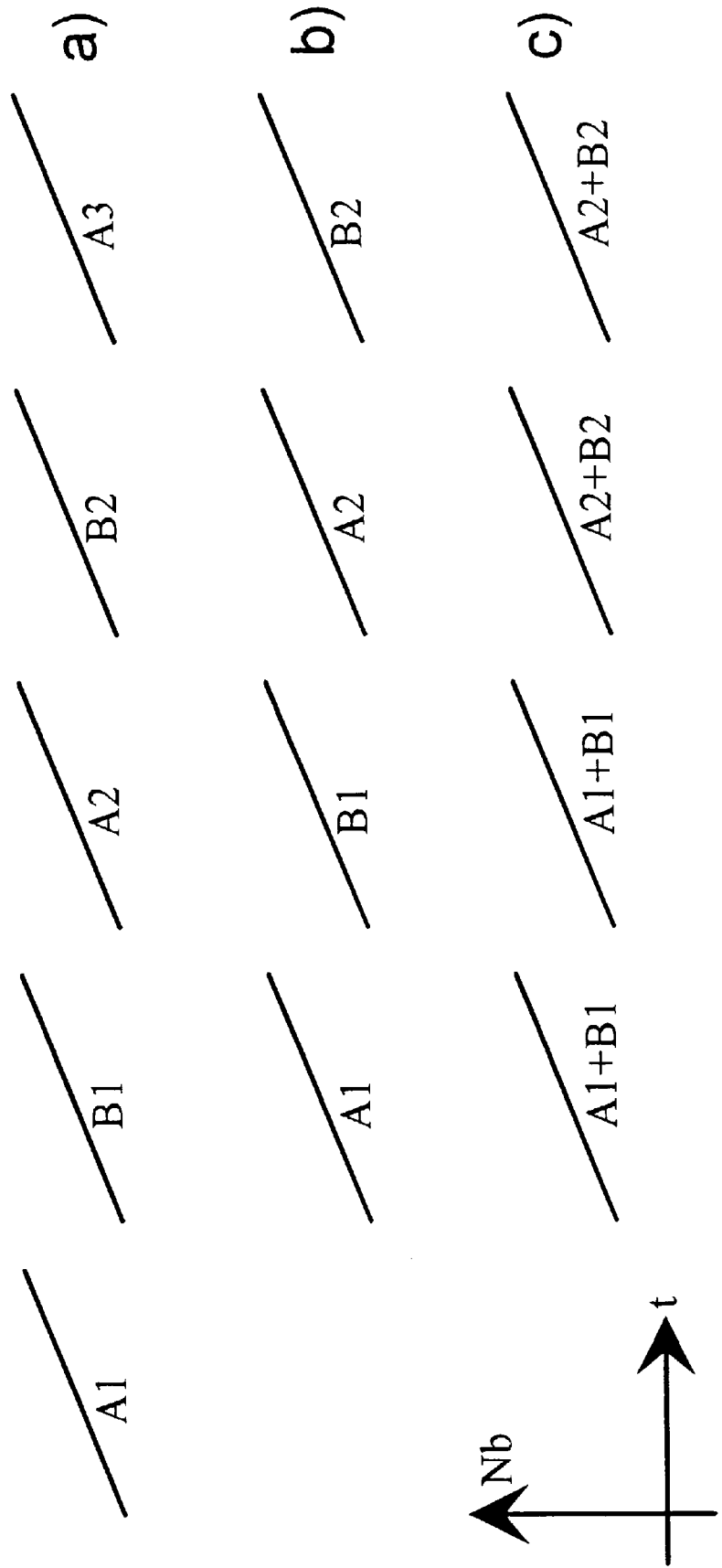

United States Patent [19]

Hirtz et al.

[11] Patent Number: 6,118,487

[45] Date of Patent: Sep. 12, 2000

[54] METHOD AND CIRCUIT ARRANGEMENT FOR THE MEMORY-OPTIMIZED PROCESSING OF A COMPOSITE VIDEO BASEBAND SIGNAL CVBS SIGNAL

[75] Inventors: Gangolf Hirtz, Niedereschach; Thomas Hollmann; Michael Maier, both of Villingen-Schwenningen, all of Germany

[73] Assignee: Deutsch Thompson-Brandt GmbH, Villingen-Schwenningen, Germany

[21] Appl. No.: 08/847,033

[22] Filed: May 1, 1997

[30] Foreign Application Priority Data

May 8, 1996 [DE] Germany .................... 196 18 351

[51] Int. Cl.[7] .............. H04N 7/01; H04N 11/20
[52] U.S. Cl. ............ 348/443; 348/458; 348/459; 348/714
[58] Field of Search ................. 348/714, 715, 348/716, 717, 718, 719, 469, 607, 443, 447, 448, 450, 453, 458, 459; H04N 7/01, 11/20

[56] References Cited

U.S. PATENT DOCUMENTS

| | | | |
|---|---|---|---|
| 4,602,275 | 7/1986 | Smith et al. | 358/11 |
| 4,879,606 | 11/1989 | Walter et al. | 358/330 |
| 5,323,238 | 6/1994 | Yoshimura et al. | 348/571 |
| 5,325,189 | 6/1994 | Mimura | 348/231 |
| 5,461,487 | 10/1995 | Asakura | 348/497 |
| 5,469,228 | 11/1995 | Kim et al. | 348/715 |
| 5,479,212 | 12/1995 | Kurobe et al. | 348/409 |
| 5,500,739 | 3/1996 | Strolle et al. | 358/310 |
| 5,555,197 | 9/1996 | Ninomiya et al. | 348/571 |
| 5,777,687 | 7/1998 | De Lange | 348/563 |

FOREIGN PATENT DOCUMENTS

| | | | |
|---|---|---|---|
| 0695090A1 | 1/1996 | European Pat. Off. | H04N 7/00 |
| 3907722 | 9/1990 | Germany | H04N 5/907 |
| 4203479 | 8/1993 | Germany | H04N 7/00 |
| 695090 | 1/1996 | Germany . | |

OTHER PUBLICATIONS

Copy of Search Report Oct. 10, 1996.

E. d'Ambrosio et al.: "A 2.9 Megabit Field Memory Especially Suitable for PALplus Applications", Aug. 1, 1994, IEEE Transactions on Consumer Electronics, vol. 40, No. 3, pp. 718–726.

German Search Report dated: Sep. 15, 1997.

*Primary Examiner*—Michael H. Lee
*Attorney, Agent, or Firm*—Joseph S. Tripoli; Eric P. Herrmann; Ronald H. Kurdyla

[57] ABSTRACT

For compatible transmission of a television picture having an aspect ratio of 16:9 within a 4:3 system, transmission is effected in the letterbox format in accordance with the PALplus system specification. The receiver reconstructs the original picture with the aid of vertical filters and is able, furthermore, to suppress crosstalk interference from the luminance signals in the chrominance signals. To further improve the picture quality, the picture is displayed at a frame frequency of 100 Hz. For this purpose, the picture supplied at 50 Hz with line interlacing must be converted to a frame frequency of 100 Hz. Known concepts for PALplus decoding and 100 Hz conversion carry out these processes separately and in doing so require a great deal of memory space. By virtue of the memory control according to the invention, in which a field is stored in different memory areas (M1, M2), successive lines of a field not being stored in successive address areas or only partially being stored in successive address areas, the PALplus decoding and simultaneous 100 Hz conversion are possible with two memory modules. As a result, a decoder with 100 Hz reproduction is possible with reduced costs.

4 Claims, 6 Drawing Sheets

METHOD AND CIRCUIT ARRANGEMENT FOR THE MEMORY-OPTIMIZED PROCESSING OF A COMPOSITE VIDEO BASEBAND SIGNAL CVBS SIGNAL

The invention relates to a method and a circuit arrangement for the memory-optimized processing of a CVBS signal which is compatible with conventional colour television transmission systems, in particular of a PALplus signal.

PRIOR ART

For compatible transmission of a television picture having an aspect ratio of 16:9 within a 4:3 system, transmission is effected in the letterbox format in accordance with the PALplus system specification. For this purpose, the 576-line input picture is processed in such a way that the vertical low-frequency signal components are transmitted within the central 432 lines of the picture. The vertical high-frequency signal components are then transmitted in the remaining 144 lines of the picture. These additional information items form the definition information of the picture and are also referred to as helper signal. The helper signal in this case has a small amplitude and is incorporated in the black region of the picture information.

The helper signal is invisible to a compatible 4:3 receiver, only the central main area of the picture is displayed. 72 lines both above and below are therefore black (so-called letterbox picture). The PALplus receiver is, on the other hand, able to reconstruct, on the basis of the main and helper signals, a picture having the full resolution of the original 576-line picture. For this purpose, the high-frequency helper information and the low-frequency information of the main picture are added with the aid of vertical filters. Moreover, with appropriate pre-processing of these signals at the transmitter end, the PALplus receiver is able to suppress crosstalk interference from the luminance signals to the chrominance signals (cross-colour) and vice versa (cross-luminance).

The method for reconstructing the picture depends on the source which supplies the picture. If a film is present, then the latter has only 25 frames per second, with the result that both fields of the line-interlaced frame originate from the same motion phase. This is utilized in the so-called film mode. The two fields are combined again to form a frame and processing is effected in the frame together with the 144 helper lines of the frame. For picture material which has been recorded using an electronic camera, both fields do not originate from the same motion phase. In this case, the picture is split and reconstructed on the basis of a field including the 72 helper lines of the field.

The method which can be employed according to the PALplus system specification for suppressing crosstalk interference depends on the motion present in the picture. The ColourPlus method is always employed for film material, this method being based on addition of the chrominance and the high-frequency luminance of the two fields at the receiver end. The Motion Adaptive Colour Plus method can be employed for material from an electronic camera. In stationary areas or in areas with little motion, the same method as for film material is employed. If there is a great deal of motion in the picture, the reduction to only 25 motion phases which is necessary for ColourPlus leads to disturbing jerkiness in the picture. A horizontal frequency division multiplex of luminance and chrominance is therefore already carried out for these areas at the transmitter end. This must be taken into account during processing at the receiver end. This necessitates a motion detector which changes over between the two modes.

For the purpose of flicker-free picture reproduction, the picture is displayed at a frame frequency of 100 Hz with line interlacing. The picture which is supplied at 50 Hz using line interlacing must for this purpose be converted to a frame frequency of 100 Hz.

In order to avoid motion artefacts, this is done in the camera mode by means of repeated calculation of the fields. If A and B are the pictures supplied by the transmitter, then the 100 Hz display is carried out using the sequence AABB. This enables the 50 Hz large-area flicker to be suppressed. The edge flicker at 25 Hz cannot, however, be avoided in this way. In the film mode, each two fields were recorded at the same instant. In this mode, the 100 Hz display is carried out in a sequence ABAB without motion artefacts occurring. Both large-area flicker and edge flicker are suppressed in this way. For the ABAB display, the main signals required in each case are read from the memories and vertical format conversion is carried out.

INVENTION

The invention is based on the object of specifying a method for the memory-optimized processing of a CVBS signal which is compatible with conventional colour television transmission systems. This object is achieved by means of the method specified in Claim 1.

The invention is based on the further object of specifying a circuit arrangement for application of the method according to the invention. This object is achieved by means of the circuit arrangement specified in Claim 11.

Frame memories are necessary both for the reconstruction of full vertical resolution and for motion-dependent changeover of crosstalk suppression. Since the said memories belong to the expensive components of the PALplus decoder, optimum utilization of the memories is made.

Known concepts for PALplus decoding and 100 Hz conversion carry out these processes separately and in doing so require a large amount of memory space. In these concepts, not only are the costs for the memory higher, but also the outlay for the PCB and the test of the module is increased.

In principle, therefore, the inventive method for the memory-optimized processing of a CVBS signal which is compatible with conventional colour television transmission systems, in particular of a PALplus signal which is composed of a main area and additional information items and is transmitted in fields, the fields being buffer-stored and reproduced at a multiple of the transmission frequency, consists in the fact that a field is stored in different memory areas, successive lines of a field not being stored in successive address areas or only partially being stored in successive address areas.

Particularly in the case of film mode processing, it is advantageous here to store a first group of the lines of the main area of a field in a first memory area and to store a second group of the lines of the main area of a field in a second memory area.

In this case, the stored lines of the main area of two successive fields can be simultaneously read repeatedly in succession, in which case, during the read-out of these fields, a first field arriving later is already stored in two free address areas of the first and second memory areas and a further field arriving later is stored in two address areas already used by one of the first fields.

In this case, the successive lines of the main area are preferably written alternately to the first and second memory area. However, it is also possible to write one picture half of the main area to the first memory area and the other picture half to the second memory area.

The lines of the main area are preferably combined for the purpose of reducing cross-colour interference and cross-luminance interference, are fed to a vertical filtering arrangement for the purpose of up-conversion and the fields are reproduced at a repetition rate of 100 Hz in the ABAB mode.

In the case of camera mode processing, it is particularly advantageous to store the lines of the main area of successive fields in the first memory area and to store the additional information items of successive fields in separate sections of the second memory area.

Preferably, of a field, first of all a first group of additional information items, then the lines of the main area and then a second group of additional information items are read into the memory.

In this case, the additional information items can be stored with 6 bits per sample and with horizontal subsampling by a factor of 2.

Preferably, furthermore, the lines of the main area and of the additional information items are fed to a vertical filtering arrangement for the purpose of up-conversion and the fields are reproduced at a repetition rate of 100 Hz in the AABB mode.

In principle, the inventive circuit arrangement for the memory-optimized processing of a CVBS signal which is compatible with conventional colour television transmission systems, in particular of a PALplus signal which is composed of a main area and additional information items and is transmitted in fields, the fields being buffer-stored and reproduced at a multiple of the transmission frequency, consists in the fact that provision is made of a plurality of memories, in which a field is stored, a memory controller ensuring that successive lines of a field are not stored in successive address areas or are only partially stored in successive address areas.

DRAWINGS

Figure 2:
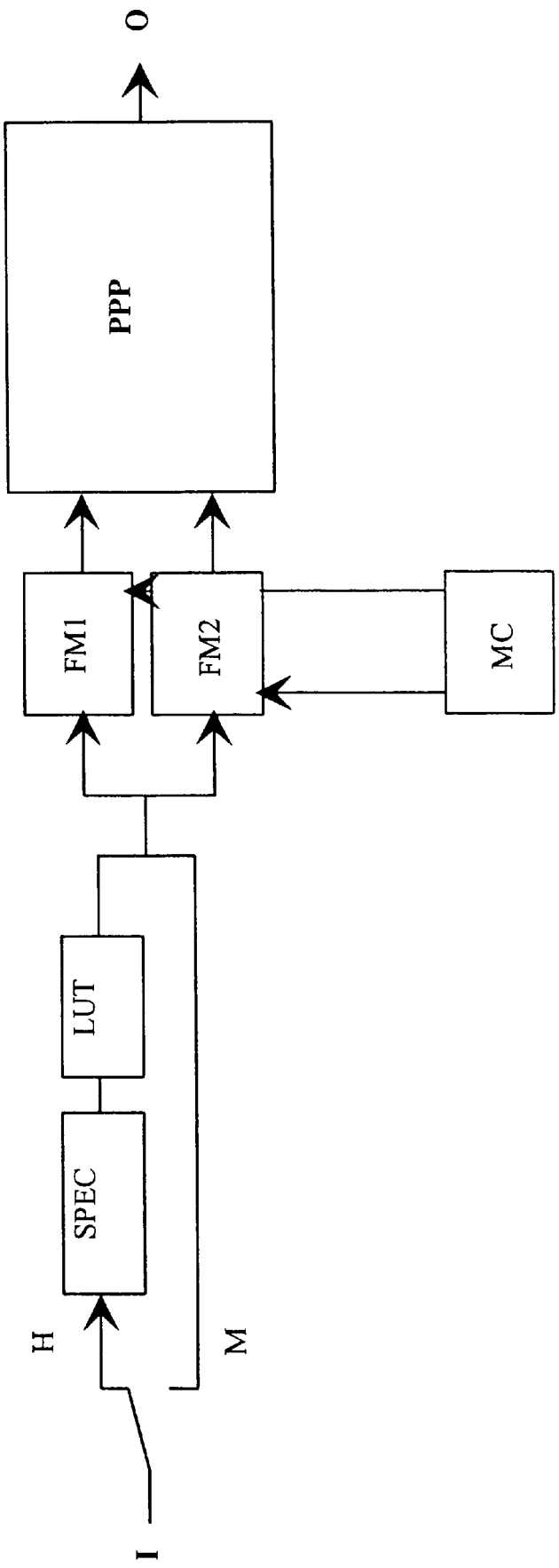
Figure 3A:
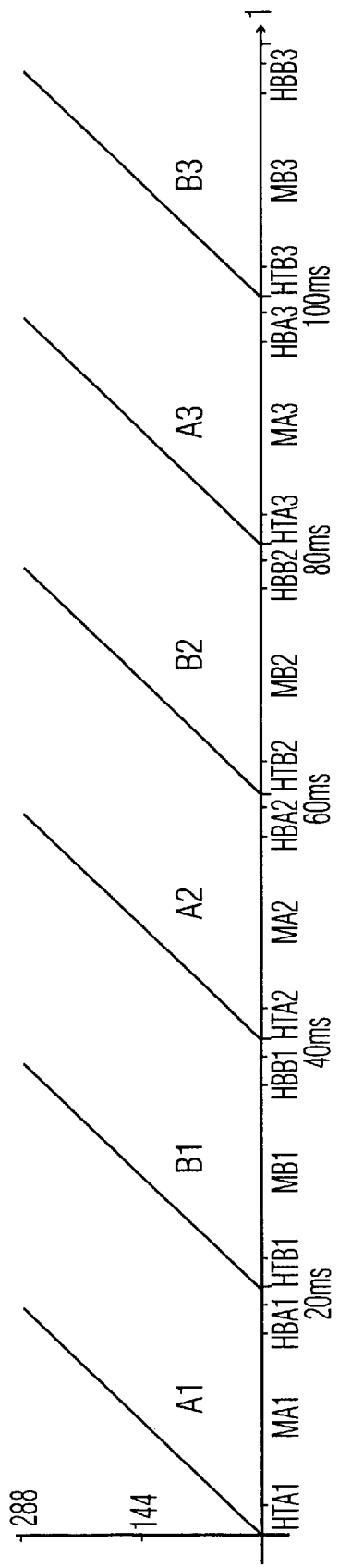
Figure 3B:
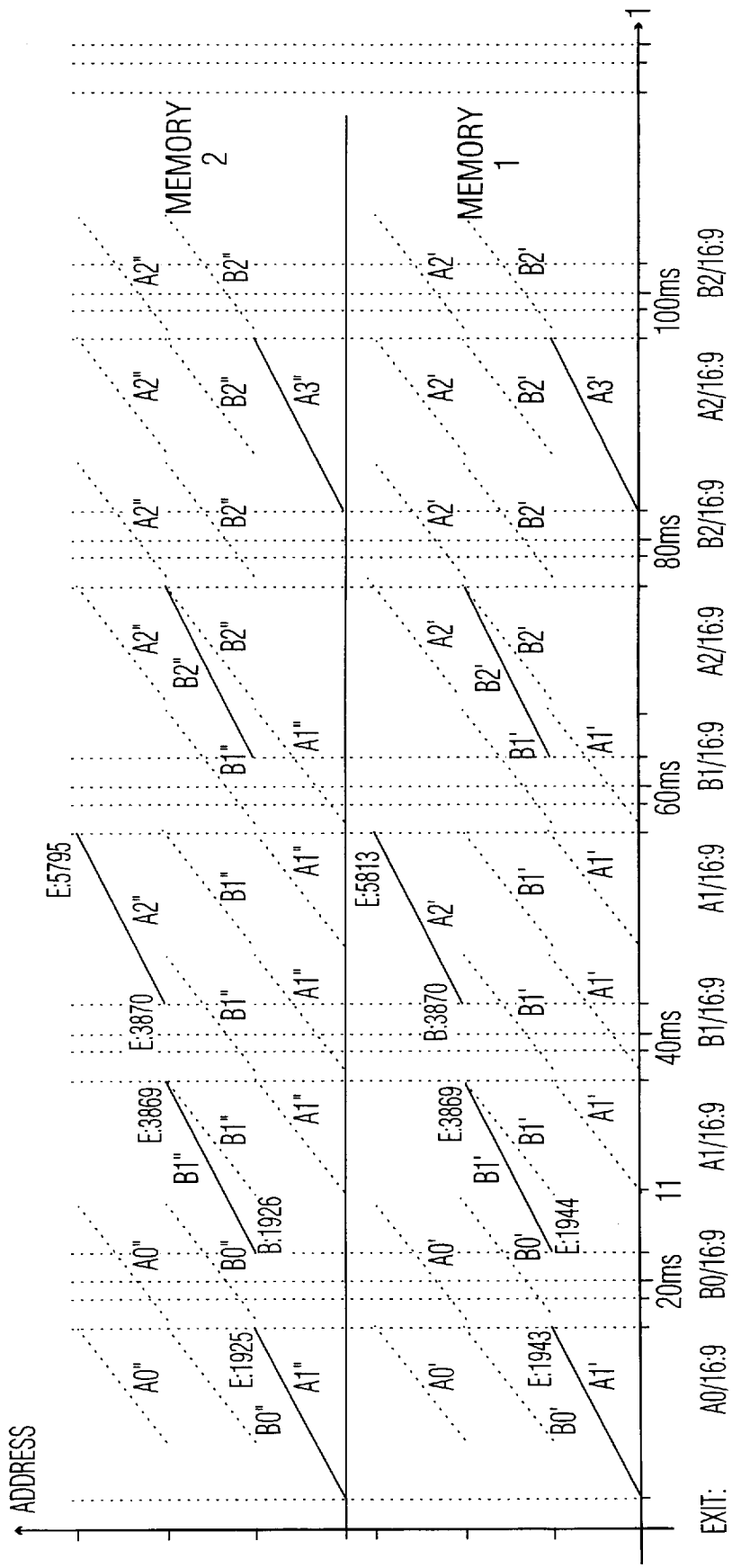
Figure 4A:
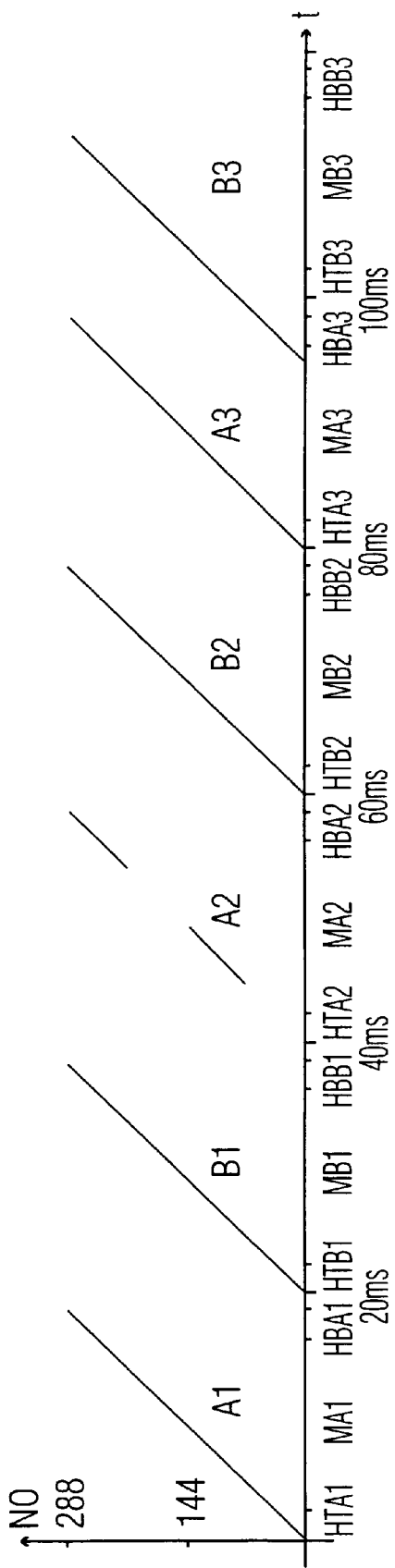
Figure 4B:
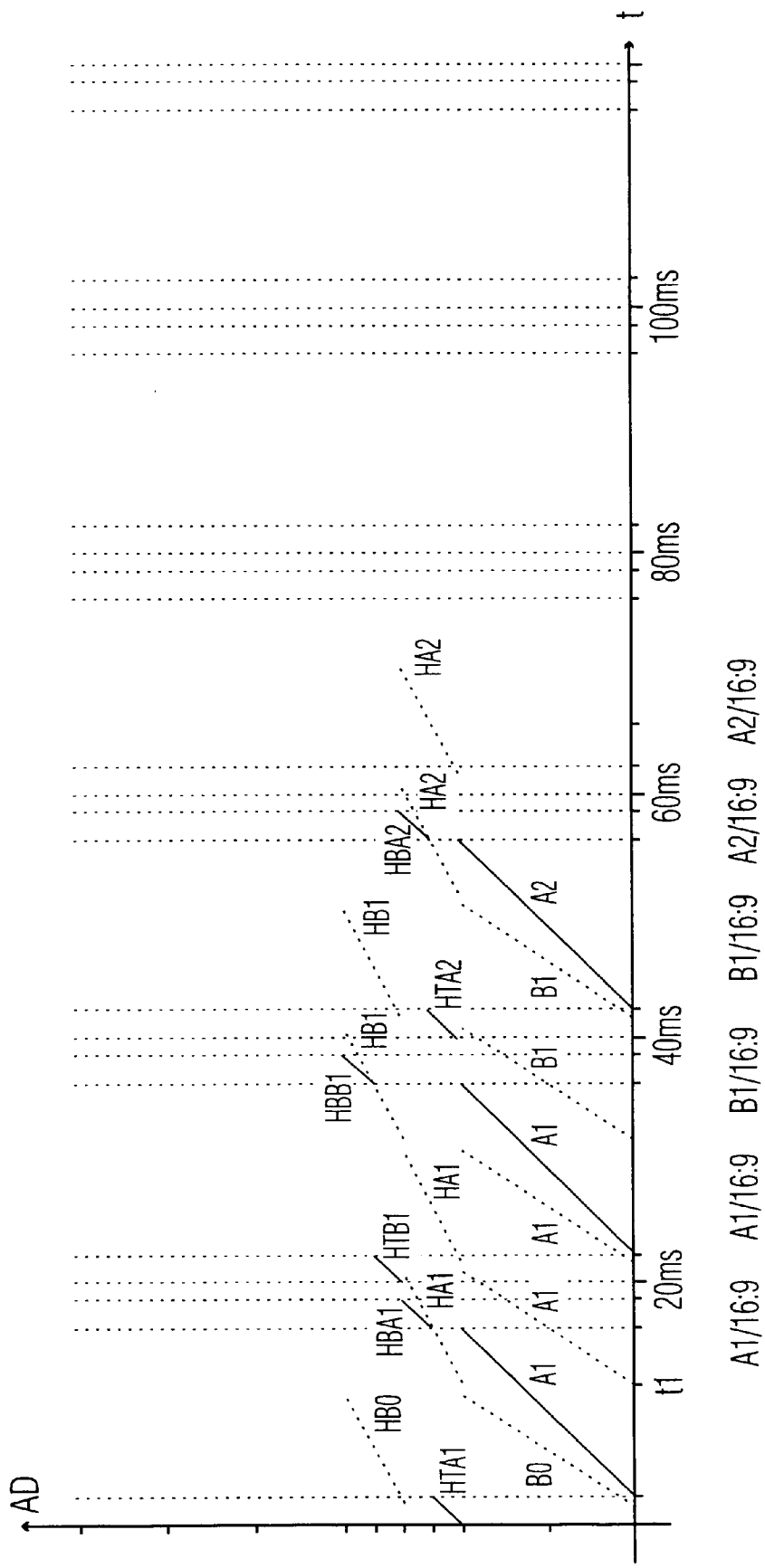

Exemplary embodiments of the invention are described with reference to the drawings, in which FIG. 1 shows the receiver-end processing of the signals according to the ColourPlus method, FIG. 2 shows the inventive structure of a PALplus decoder for implementing the memory control according to the invention, FIG. 3 shows the memory control according to the invention for the film mode, the incoming picture being illustrated in a) and the storage of the data being illustrated in b), FIG. 4 shows the memory control according to the invention for the camera mode, the incoming picture being illustrated in a) and the storage of the data being illustrated in b).

EXEMPLARY EMBODIMENTS

FIG. 1 illustrates receiver-end processing in the film mode. This mode is employed when the material present has been recorded by a film camera and, accordingly, has only 25 motion phases per second. In order to suppress crosstalk interference, at the transmitter end, after film scanning at 50 Hz with line interlacing, every second field is omitted in the chrominance and in the high-frequency luminance and the remaining field is in each case repeated once. The PAL modulation and demodulation which then follow generally lead to crosstalk interference (cross-colour and cross-luminance), which must be excluded at the receiver end.

The incoming sequence, illustrated in FIG. 1a, of the first fields A and second fields B is delayed by the duration of one field (FIG. 1b). The fields associated with a frame are then averaged (FIG. 1c) on the basis of the input sequence and the delayed sequence. This averaging is carried out for the chrominance and for the horizontal high-frequency luminance. On account of the properties of the colour subcarrier, this leads to the elimination of the respective crosstalk interference. Subsequent field repetition yields a crosstalk-free sequence having a frame frequency of 50 Hz. This processing (ColourPlus) leads to a transmission of only 25 motion phases for the chrominance and the high-frequency luminance, which does not constitute a restriction in the case of film material.

The letterbox picture is calculated at the transmitter end on a frame basis. For this purpose, the two fields are combined again to form a frame. Subsequent vertical filtering splits the signal into a low-frequency component (16:9 main picture) and a high-frequency component (helper signal). The helper lines are then sorted into the upper and lower letterbox bars. The helper lines for the top half of the main picture are located in the top letterbox bars (Helper Top) of the two fields, while the helper lines for the bottom picture half can be found in the bottom edge lines (Helper Bottom) of the two fields.

In the receiver, each two associated fields must be combined again to form a frame for the purpose of reconstructing 576 lines. A 576-line 16:9 picture can be calculated with the aid of vertical filters and the main lines of two associated fields. The helper lines supplied by the transmitter are low in energy in the film mode. Using them for the format conversion does not lead to a clear quality improvement in most pictures.

The ColourPlus method can be applied only to a limited extent to sequences which have been produced using an electronic camera (50 Hz, 2:1). The method—dictated reduction to 25 motion phases per second in the chrominance and in the horizontal high-frequency luminance leads to disturbing jerkiness in moving picture contents. In the PALplus system specification, therefore, a motion-dependent variant of the ColourPlus method is provided in this so-called camera mode. However, additional memory space must be made available for this.

The splitting into main and helper areas is effected on a field basis in this mode. The helper lines for the top area of the main picture of the first field are located in the top black stripe of the first field; the helper lines for the bottom picture half are located in the bottom black stripe. Accordingly, the helper lines for the second field can be found in the helper areas of the second field.

The helper signal, which transmits the vertical height information items, must be invisible to the compatible receiver and must nevertheless be insensitive to noise. It is therefore subjected to a plurality of processing steps. After the helper signal has been separated from the video signal at the transmitter end, it is subjected to a companding operation which, on the one hand, limits the amplitude of the helper and, on the other hand, amplifies small helper amplitudes more than large ones, with the result that it becomes less sensitive to noise. Subsequent horizontal filtering slightly decreases high-frequency helper values and implements band limiting to about 2.5 MHz/−6 dB. These steps must be reversed again at the receiving end. A horizontal filter increases high-frequency helper values (Inverse Spectrum Shaping) and a decompanding characteristic equalizes the transmitter-end companding of the helper.

Since the helper signal contributes only insignificantly to an improvement in the picture quality in the film mode, but on the other hand requires memory space, its use in the PALplus decoder may be dispensed with. In the camera mode, in contrast, the helper signal should always be employed. For reasons of memory space, the ColourPlus processing can be restricted to the film mode, thereby not using the motion-adaptive variant in the camera mode. A comb filter or a horizontal filter can then be used in the camera mode in order to separate luminance and chrominance.

FIG. 2 shows a total system according to the invention for PALplus decoding. It is to be assumed that the incoming picture I has already been digitized. The luminance and the helper signal have been sampled at 13.5 MHz. The chrominance has already been demodulated and sampled at 3.75 MHz (4:1:1 system). The helper signal H is now subjected to the horizontal filtering for spectra shaping SPEC, is subsequently fed to the look-up table LUT for the purpose of decompanding and is then stored. The main signal M is routed past these operations and likewise stored. The PALplus processing PPP then carries out the following operations:

In the film mode: ColourPlus for the purpose of reducing crosstalk interference:

Vertical format conversion in the frame without using the helper signal;

in the camera mode: vertical format conversion in the field using the helper signal.

Use is made of two memories FM1, FM2, in which the fields are respectively stored before they are fed to the PALplus processing. A memory controller MC in this case ensures that successive lines of a field are not stored in successive address areas or are only partially stored in successive address areas.

The memory controller MC is described below by way of example for memory modules with the organization 6144Blocks*40Words*12Bits, each block being individually addressable as the memory having one writing port and one reading port (Dual Port Memory).

The following abbreviations shall apply:

| | |
|---|---|
| A: | first field |
| B: | second field |
| HT: | top helper (Helper Top) |
| HB: | bottom helper (Helper Bottom) |
| M: | central picture area (Main) |
| A' (A"): | first (second) part of the first field |
| — | memory write |
| ... | memory read |

FIG. 3 shows the memory control for the film mode. FIG. 3a) illustrates the incoming picture. Accordingly, the field A1 is composed of the 36 lines of the top helper HTA1, the main area MA1 having 216 lines, as well as the bottom 36 helper lines HBA1. FIG. 3b) illustrates the storage of these data. Only the main lines are stored, since the helper signal is not used in the film mode. The main lines are written alternately to memories M1 and M2. As an alternative, it is also possible to write one picture half to one memory and the other picture half to the other memory.

The sequential read-out of the stored values begins at the instant t1. For the film mode processing, the main lines of two successive fields (for example A1 and B1) must be simultaneously read out. Since two associated lines are never stored in the same memory module, they can be read out in parallel at 27 MHz. For the main lines, the ColourPlus processing can then be carried out and the results made available to the vertical filters for the purpose of up-conversion. Due to the delayed start of the read-out, the required lines of the two fields are available for processing for a field duration of 10 ms.

Owing to the frame processing in the film mode, the two fields (A1 and B1) are also necessary for the calculation of the second outgoing field (B1/16:9) and must once again be read out for this purpose. During the read-out of these fields, however, it is already necessary to store the field A2 just arriving. In order that the fields A1 and B1 which are still required are not overwritten, a memory area which is still free must be used. The lines of A2 are in turn written alternately to memories M1 and M2. Field B2 can always be written to the same memory area, since no conflicts occur. In order to calculate A2/16:9, A2 and B2 can now be read out and converted. The same area as A1 will be used to store A3, as illustrated.

A cyclic write/read control by way of 4 (input) fields is consequently produced. By virtue of the optimized storage and control of the memories, two memory modules are thus sufficient for this mode.

FIG. 4 shows the memory control for the camera mode. The memory area for the main area A and the main area B is identical. Separate areas are used for the helper signals of A and B. The read-out again begins at the instant t1. The field A1/16:9 also requires only the helper of this field, since the splitting has been carried out only in the field. A1 is calculated twice for the 100 Hz display. The lines of B1 are at yet required here, since the ColourPlus processing is not carried out. B1 can be written to the same area as A1. For this purpose, lines of A1 which are no longer required are overwritten. The helper signal of B1 is written to its separate area. After A1 has been calculated twice, B1 can be calculated twice. Main and helper lines of B1 are available in good time. The cycle begins anew with the storage of A2. If the helper signal is stored with only 6 bits per sample and with horizontal subsampling by a factor of 2, then it is possible to store helper and main signals in just one memory module art simultaneously to carry out vertical format conversion with helper and 100 Hz reproduction.

The invention can be used, for example, for PALplus television sets, but also for devices for receiving colour television signals in accordance with a further development of other colour television systems, such as NTSC or SECAM, for example.

What is claimed is:

1. Method for the memory-optimized processing of a video signal which is compatible with conventional color television transmission systems and is composed of a main area and additional information items and is transmitted in fields, the fields being buffer-stored, comprising:

buffer storing a field in different memory areas such that successive lines of the main area are written alternately to a first and a second memory area;

combining lines of the main area for the purpose of reducing cross-colour interference and cross-luminance interference;

applying combined lines to a vertical filter to upconvert the number of lines; and reproducing successive fields A and B at a repetition rate of 100 Hz in an ABAB sequence.

2. Method for the memory-optimized processing of a video signal which is compatible with conventional color television transmission systems and is composed of a main area and additional information items and is transmitted in fields, the fields being buffer-stored, comprising:

buffer storing a field in different memory areas such that successive lines of the main area are written alternately to a first and a second memory area;

simultaneously reading stored lines of the main area of two successive fields repeatedly in succession;

combining lines of the main area for the purpose of reducing cross-colour interference and cross-luminance interference;

applying combined lines to a vertical filter to upconvert the number of lines; and reproducing successive fields A and B at a repetition rate of 100 Hz in an ABAB sequence.

3. A method for the memory-optimized processing of a video signal which is compatible with conventional color television transmission systems and is composed of a main area and additional information and is transmitted in fields, the fields being buffer-stored, the method comprising:

storing lines of the main area of successive fields in a first memory area;

storing lines of the additional information items of successive fields in separate sections of a second memory area;

horizontally subsampling the additional information items by a factor of 2;

applying lines of the main area and lines of the additional information items to a vertical filter;

vertically filtering lines of the main area and of the additional information items for the purpose of up-conversion; and reproducing successive fields A and B at a repetition rate of 100 Hz in sequence AABB.

4. A method for the memory-optimized processing of a video signal which is compatible with conventional color television transmission systems and is composed of a main area and additional information and is transmitted in fields, the fields being buffer-stored, the method comprising:

storing lines of the main area of successive fields in a first memory area;

storing lines of the additional information items of successive fields in separate sections of a second memory area;

applying lines of the main area and lines of the additional information items to a vertical filter;

vertically filtering lines of the main area and of the additional information items for the purpose of up-conversion; and reproducing successive fields A and B at a repetition rate of 100 Hz in sequence AABB.

* * * * *